H. C. KNECHT.
APPARATUS FOR MAKING RUBBER PRODUCTS.
APPLICATION FILED MAY 7, 1918.

1,374,584.

Patented Apr. 12, 1921.
12 SHEETS—SHEET 1.

INVENTOR:
Harley C. Knecht
BY Merkel and Saywell
HIS ATTORNEYS

H. C. KNECHT.
APPARATUS FOR MAKING RUBBER PRODUCTS.
APPLICATION FILED MAY 7, 1918.

1,374,584.

Patented Apr. 12, 1921.

12 SHEETS—SHEET 2.

INVENTOR
Harley C. Knecht

By Merkel and Saywell
HIS ATTORNEYS

H. C. KNECHT.
APPARATUS FOR MAKING RUBBER PRODUCTS.
APPLICATION FILED MAY 7, 1918.
1,374,584.
Patented Apr. 12, 1921.
12 SHEETS—SHEET 3.
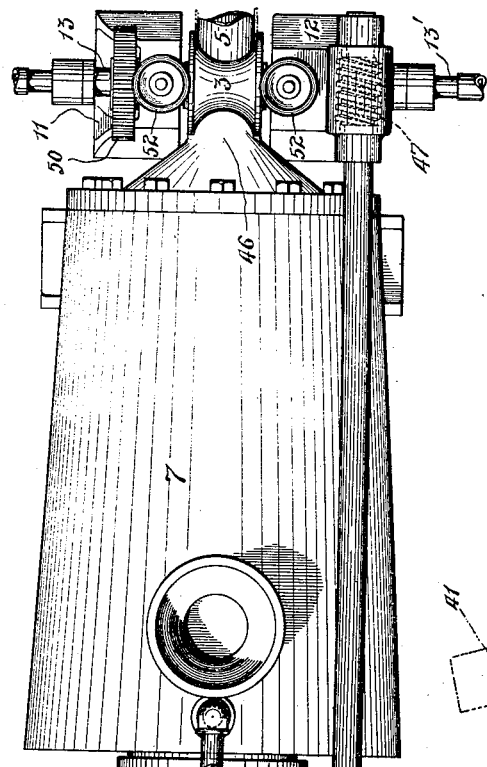
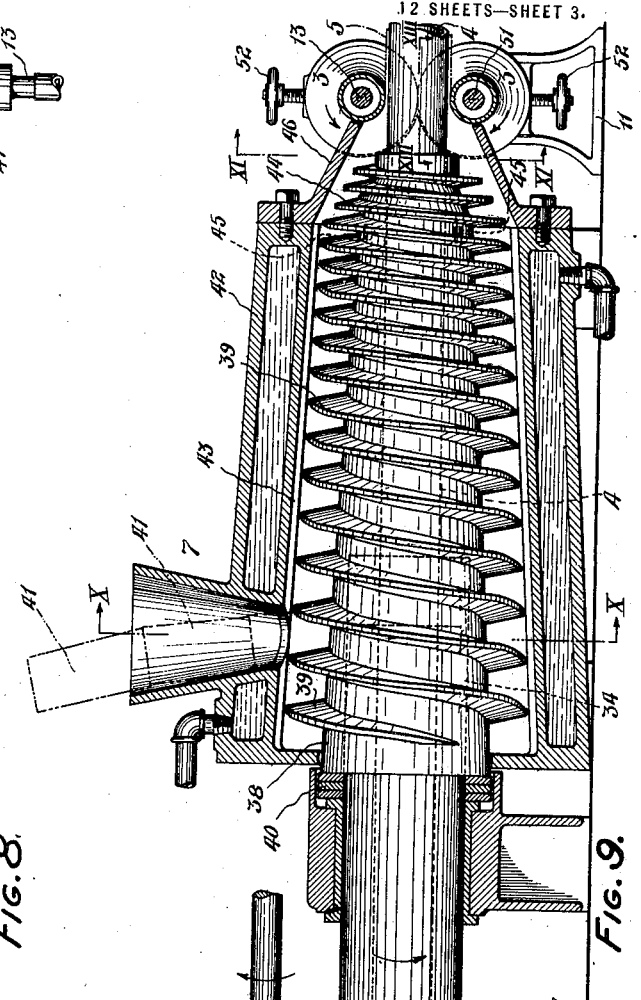
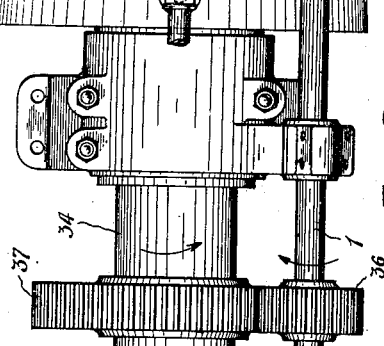
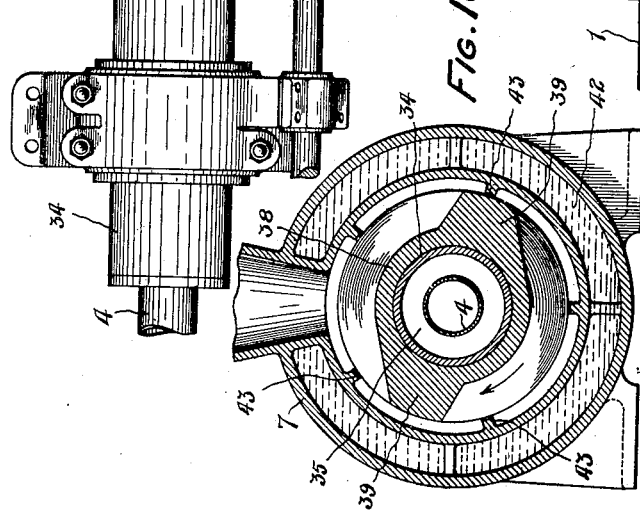
INVENTOR:
Harley C. Knecht
BY Merkel and Saywell
HIS ATTORNEYS H. C. KNECHT.
APPARATUS FOR MAKING RUBBER PRODUCTS.
APPLICATION FILED MAY 7, 1918.

1,374,584. Patented Apr. 12, 1921.
12 SHEETS—SHEET 4.

INVENTOR:
Harley C. Knecht
BY Merkel and Saywell
HIS ATTORNEYS

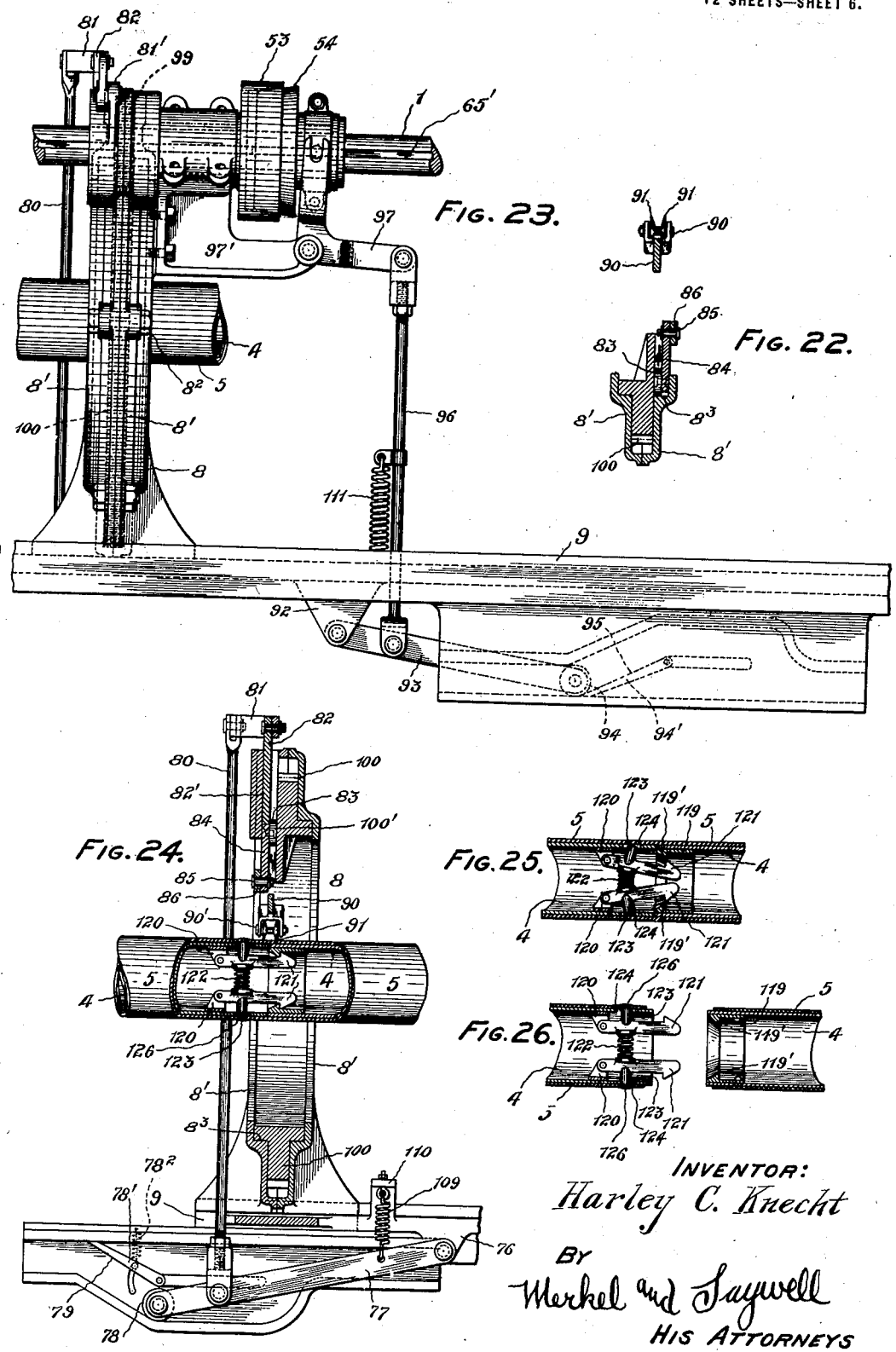

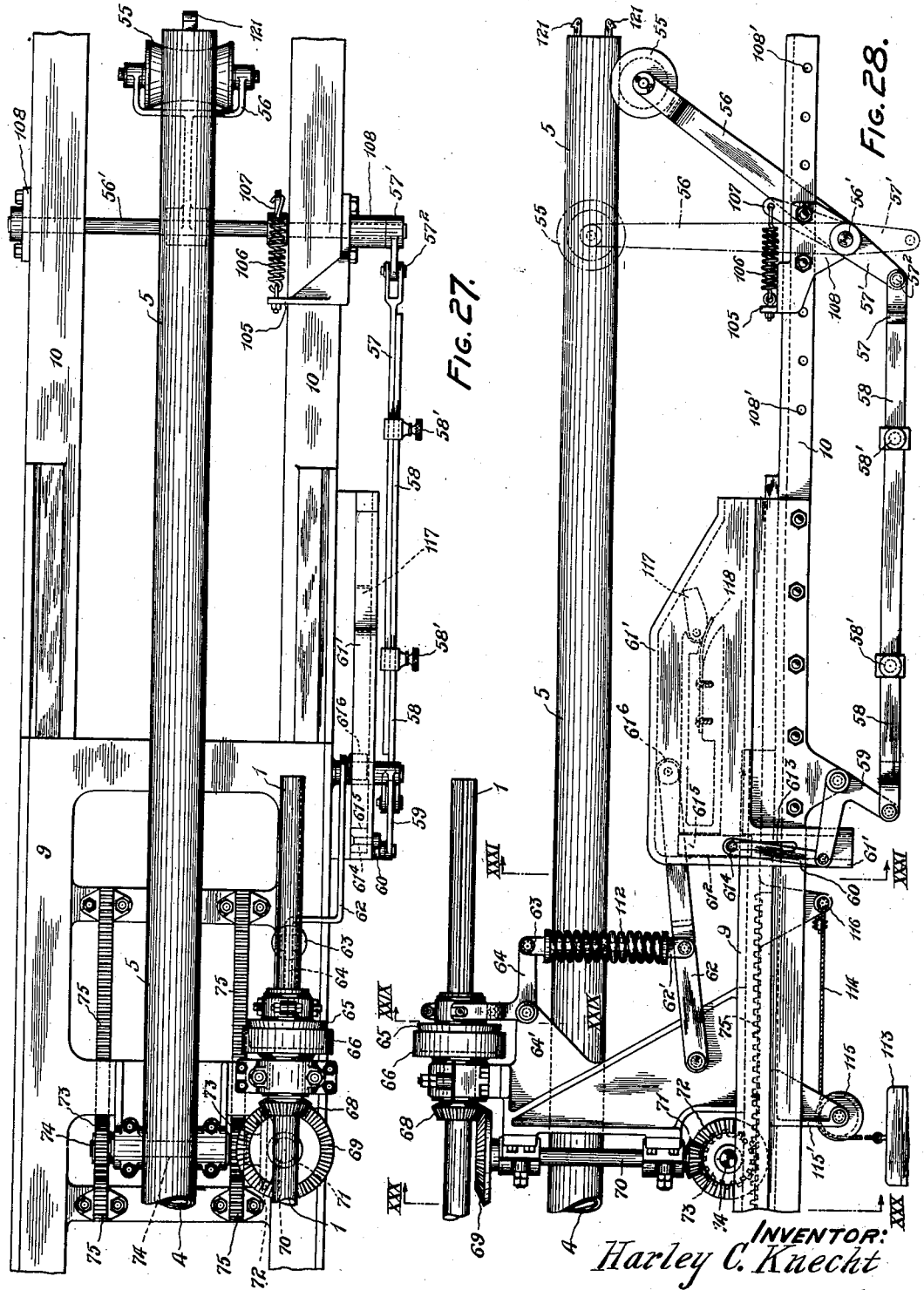

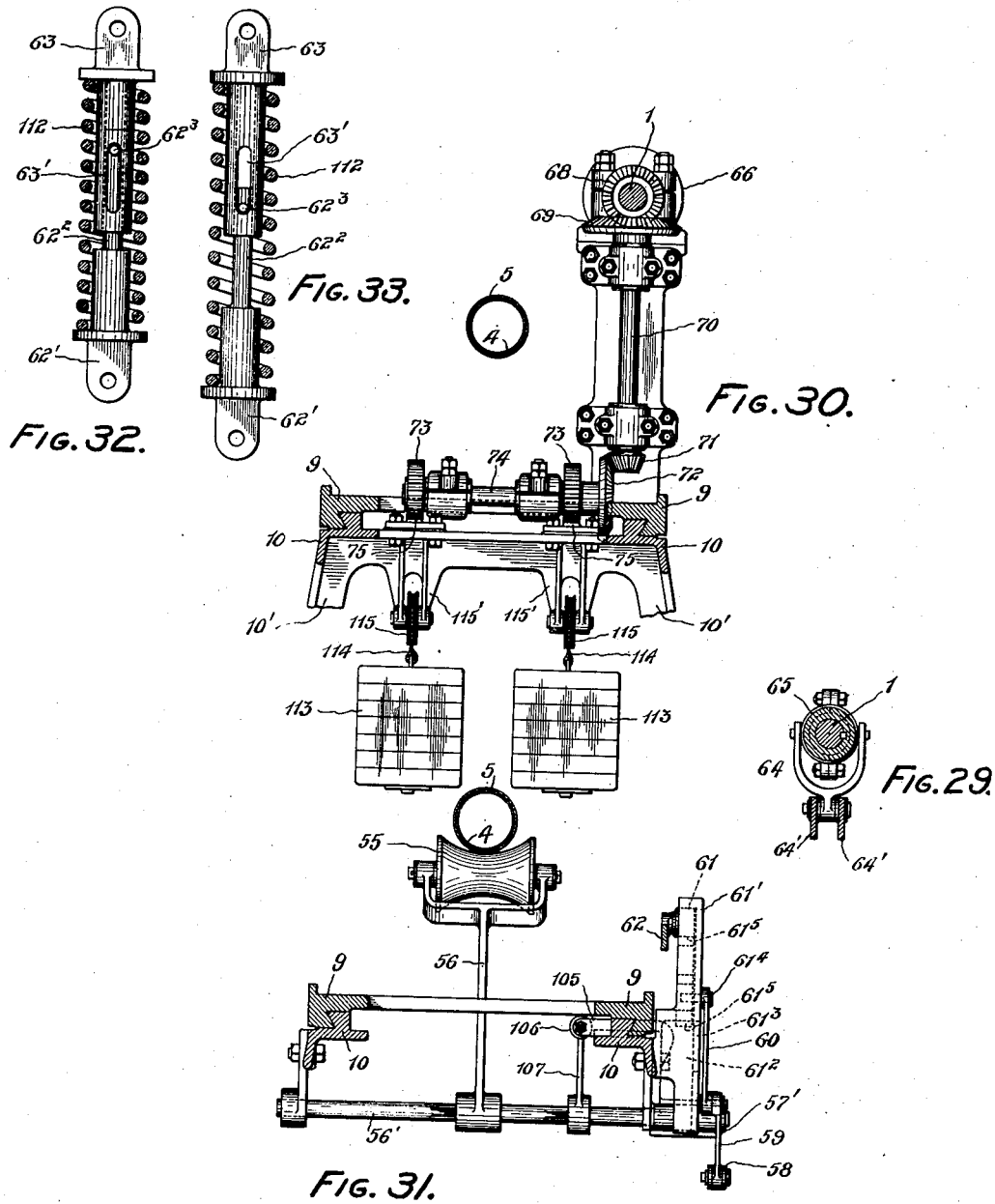

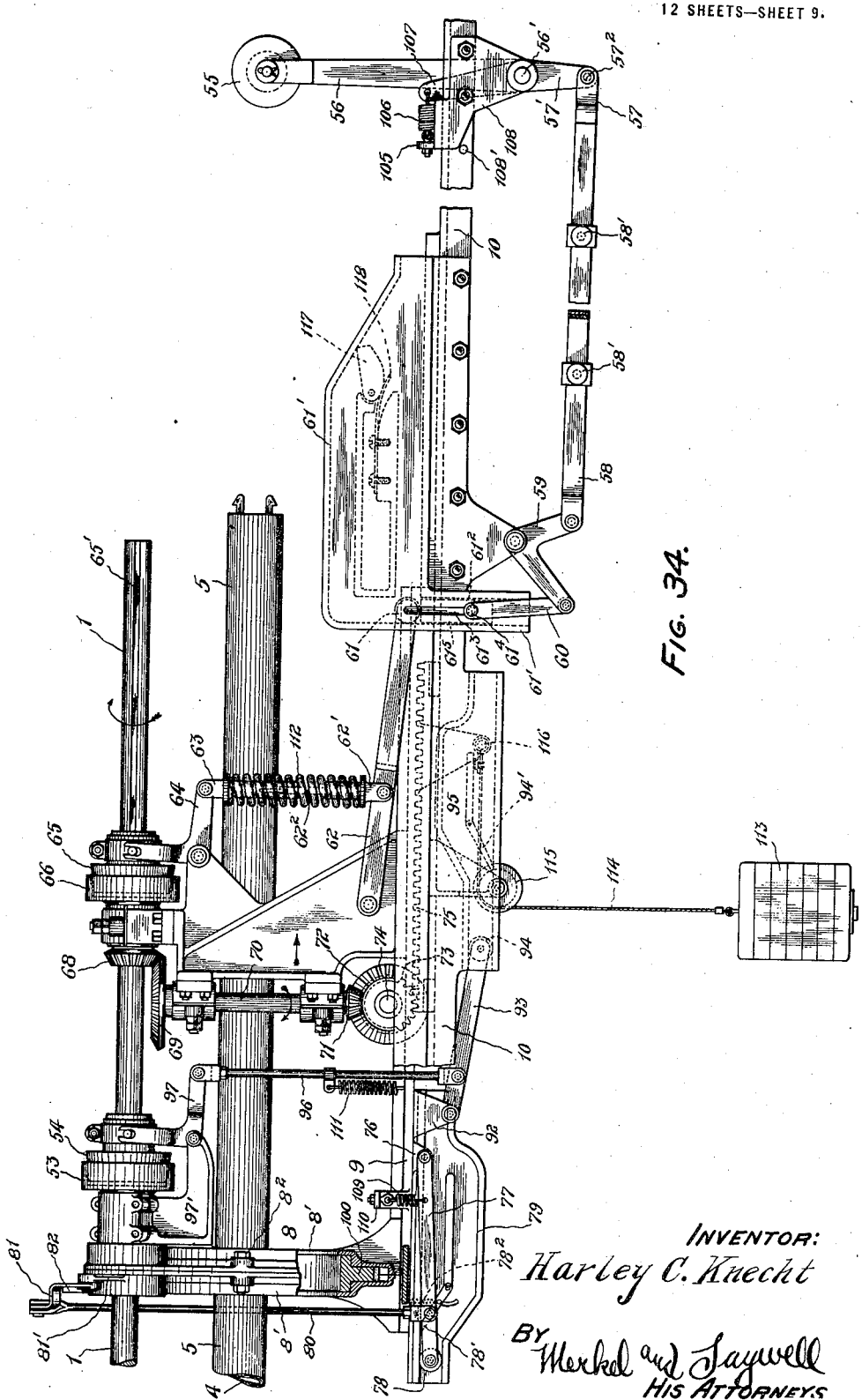

H. C. KNECHT.
APPARATUS FOR MAKING RUBBER PRODUCTS.
APPLICATION FILED MAY 7, 1918.

1,374,584.

Patented Apr. 12, 1921.
12 SHEETS—SHEET 12.

INVENTOR:
Harley C. Knecht

BY Merkel and Saywell
HIS ATTORNEYS

UNITED STATES PATENT OFFICE.

HARLEY C. KNECHT, OF AKRON, OHIO.

APPARATUS FOR MAKING RUBBER PRODUCTS.

1,374,584.  Specification of Letters Patent.  Patented Apr. 12, 1921.

Application filed May 7, 1918. Serial No. 233,046.

*To all whom it may concern:*

Be it known that I, HARLEY C. KNECHT, a citizen of the United States, resident of Akron, county of Summit, and State of Ohio, have invented new and useful Improvements in Apparatus for Making Rubber Products, of which the following is a specification, the principle of the invention being herein explained and the best mode in which I have contemplated applying that principle, so as to distinguish it from other inventions.

My invention relates to apparatus for making rubber products and particularly to such apparatus for making solid tires and the inner tubes of pneumatic tires. By my improved apparatus it is designed in the case of inner tubes to mold the rubber directly from the mills or mixers upon the forming pole and thus eliminate the calenders or sheet makers and in the case of solid tires and other rubber products to mold the same between suitable rolls, using all kinds of stock, instead of forcing the rubber through dies as is now the universal practice in so far as I am aware. Particularly economical means are provided for producing the necessary changes in the apparatus for making inner tubes and solid tires of varying lengths and thicknesses, as well as varying inner diameters in the case of the inner tubes.

The annexed drawings and the following description set forth in detail certain means showing an embodiment of my invention, the disclosed means, however, illustrating but one of the various ways in which the principle of the same may be applied.

Figure 1:
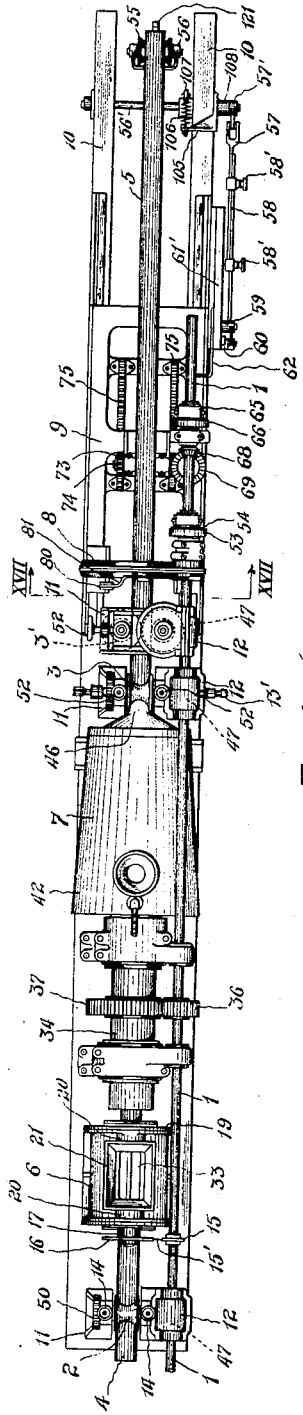
Figure 2:
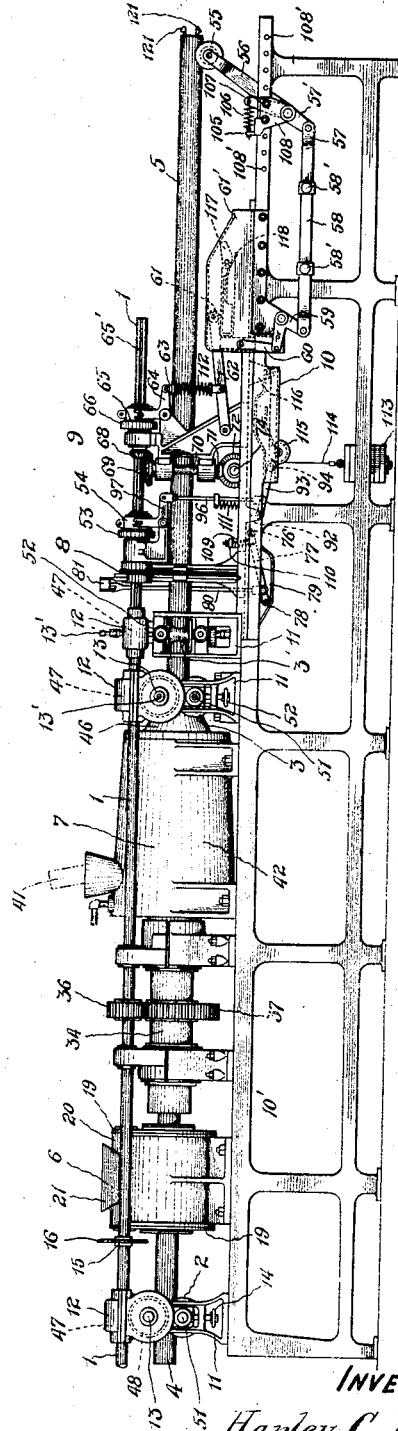
Figure 4:
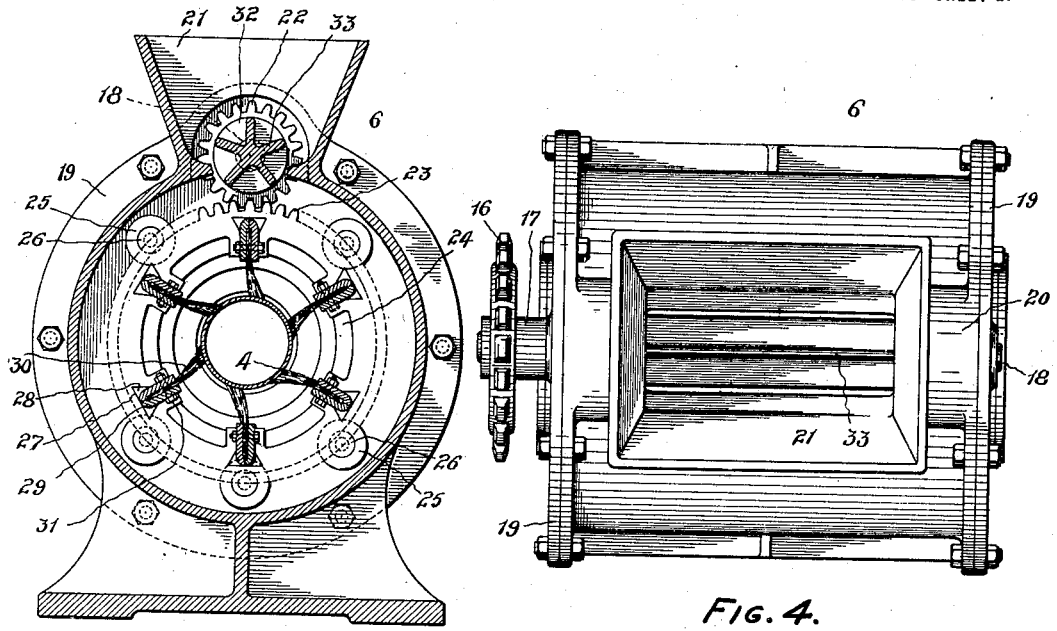
Figures 5, 6:
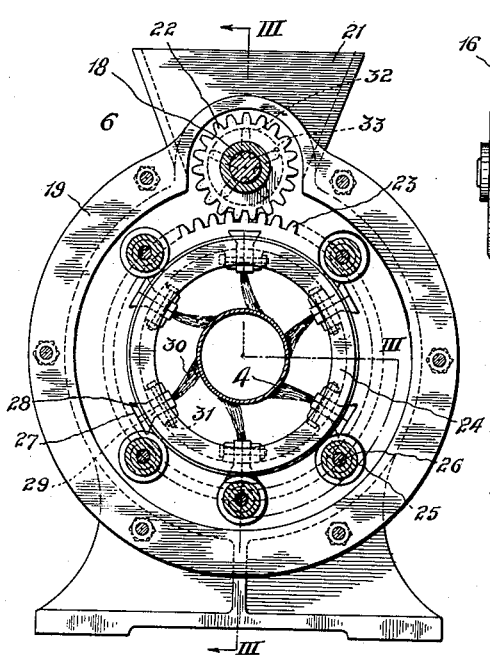
Figures 3, 7:
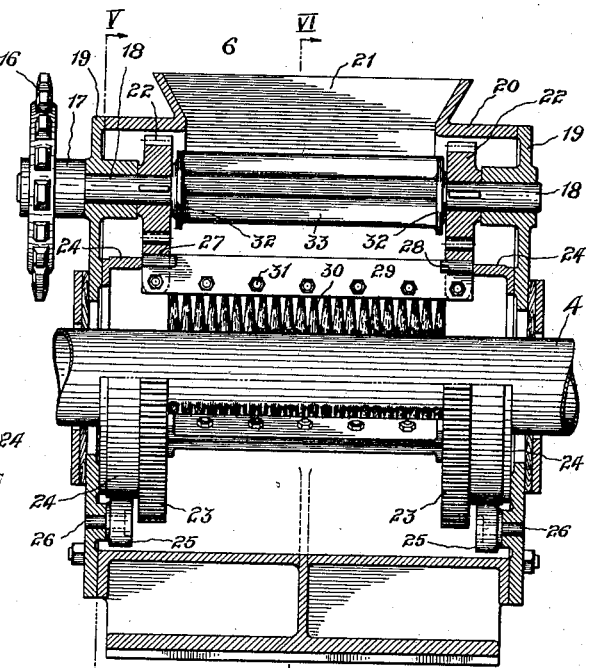
Figure 14:
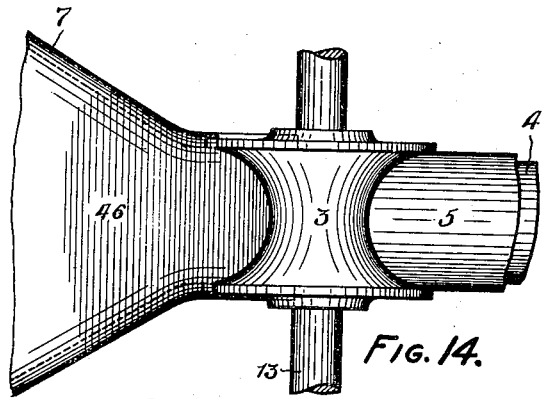
Figure 13:
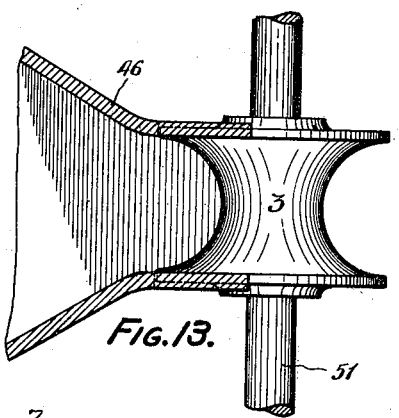
Figure 15:
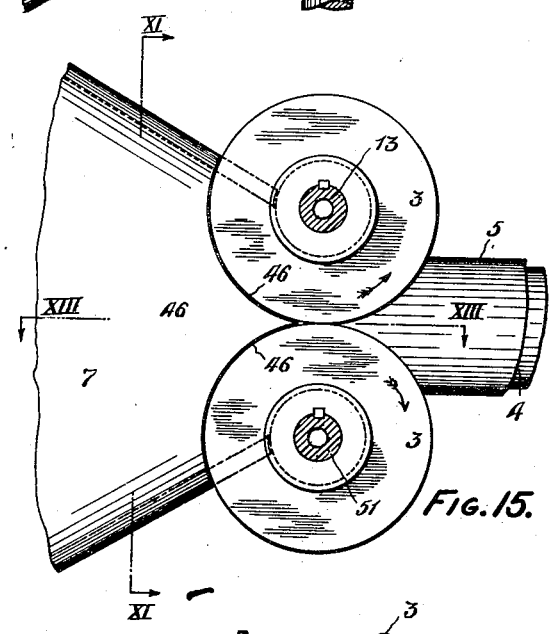
Figure 16:
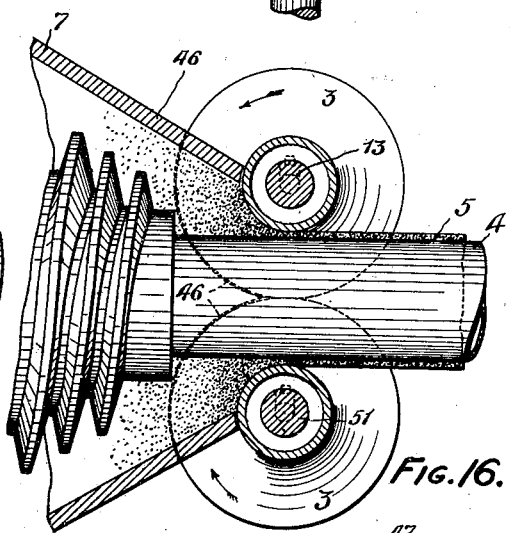
Figure 12:
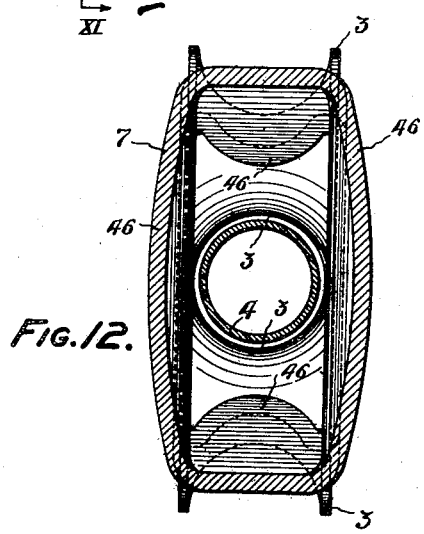
Figure 11:
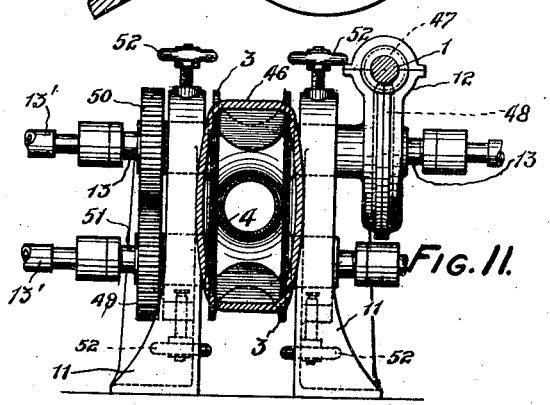
Figure 17:
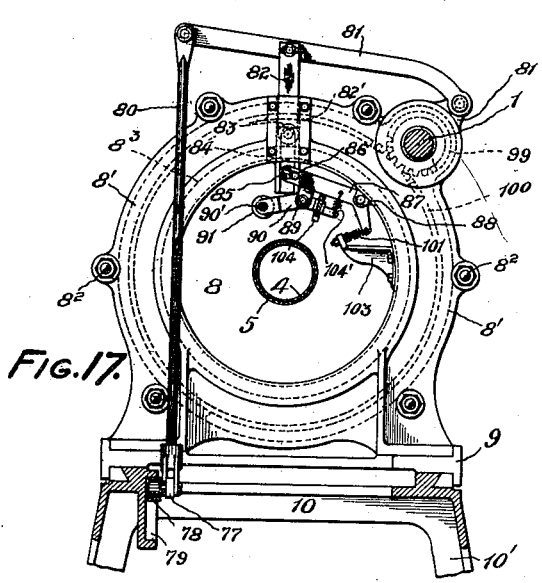
Figure 18:
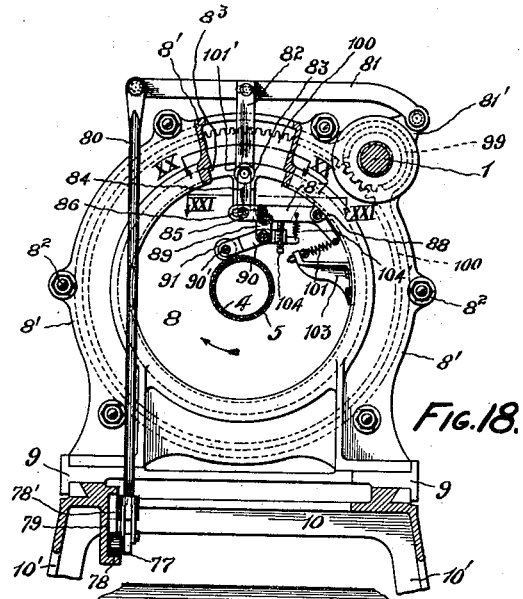
Figure 20:
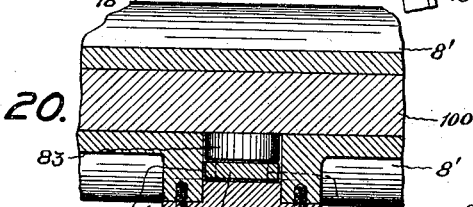
Figure 19:
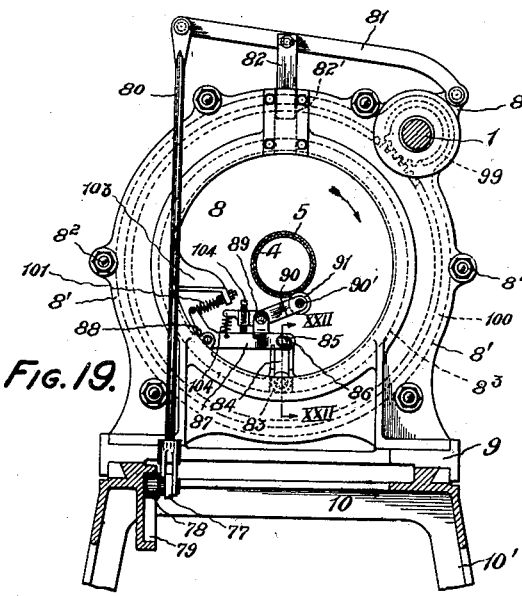
Figure 21:
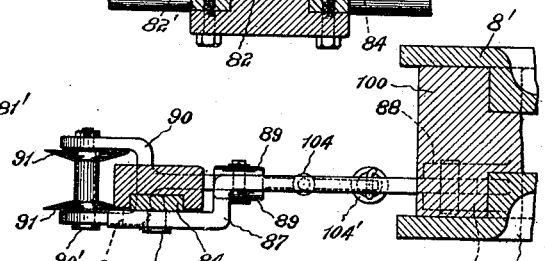
Figure 35:
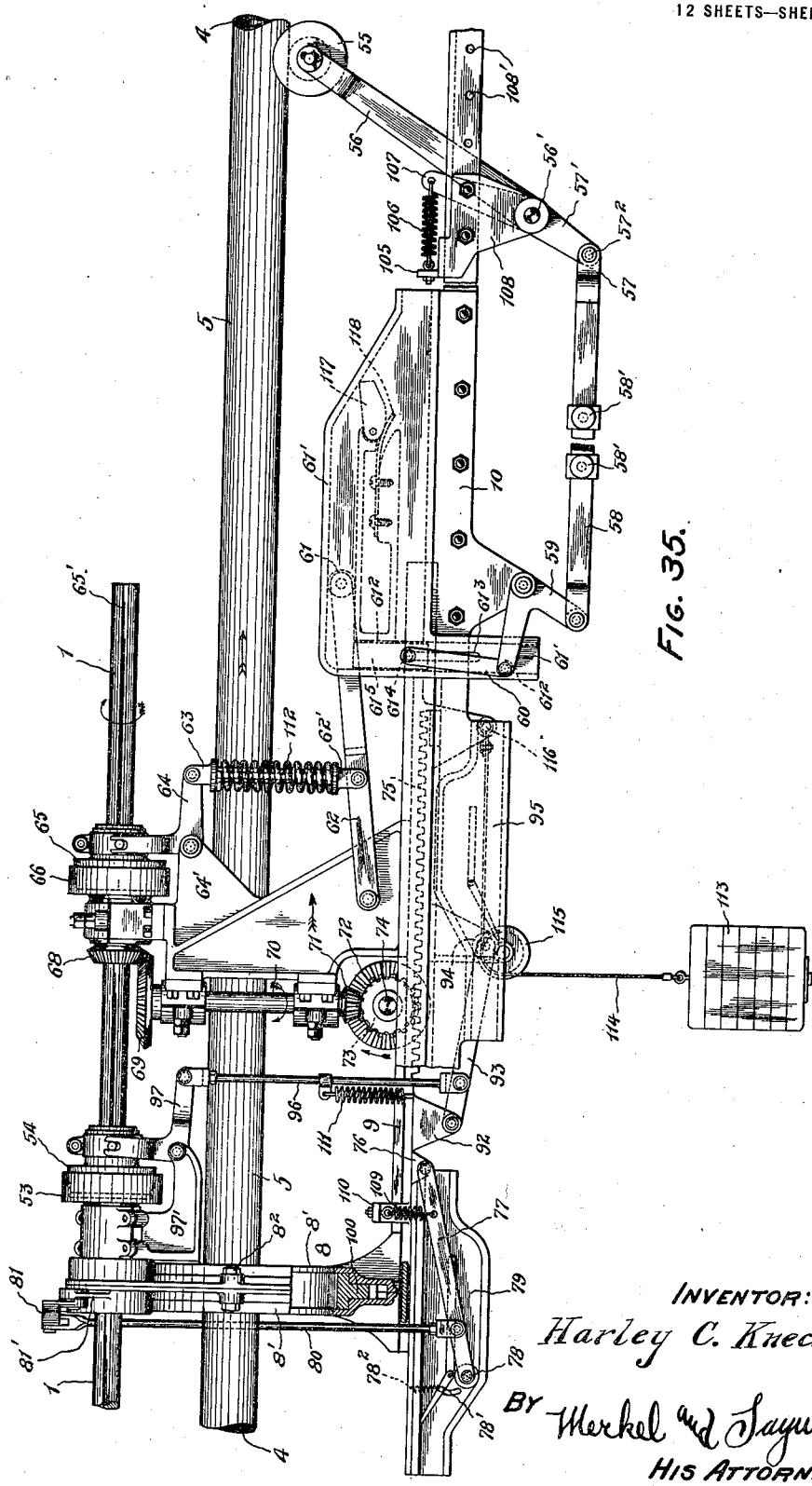
Figure 36:
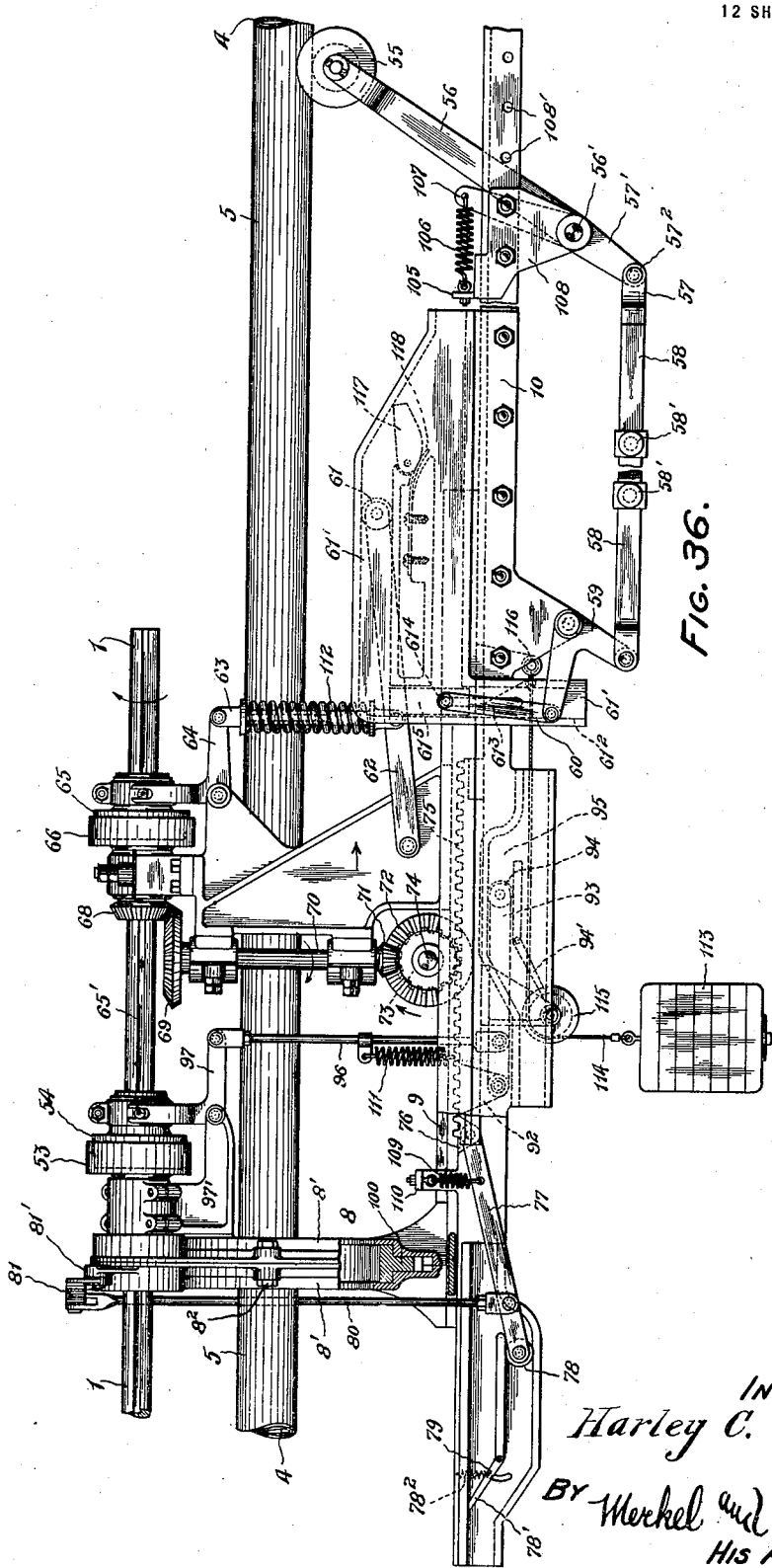
Figure 37:
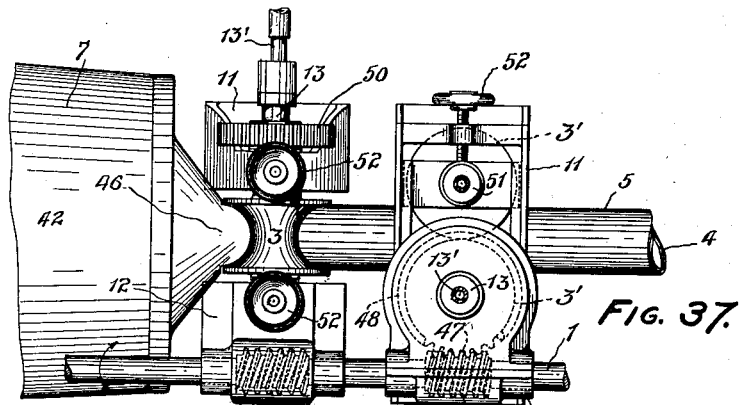
Figures 38, 39:
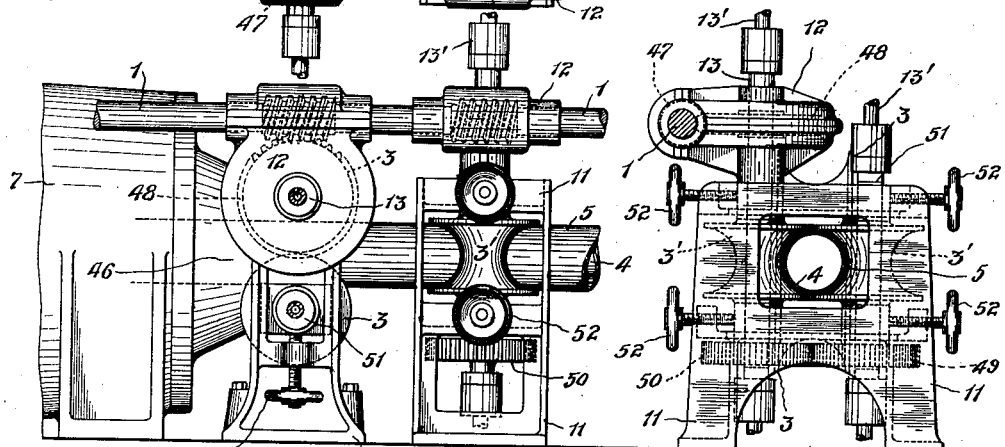
Figures 40, 41:
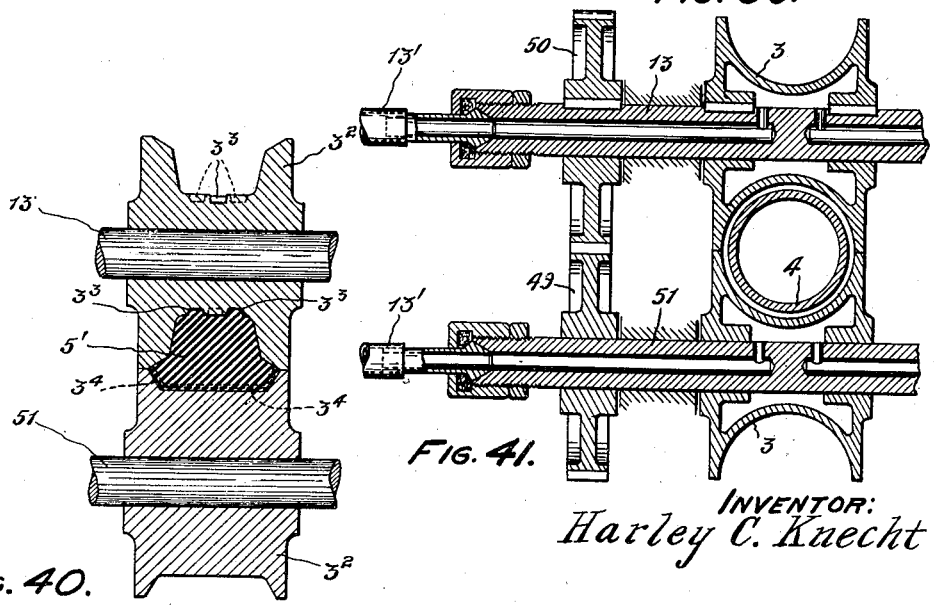

In said annexed drawings:

Figure 1 represents a plan view of the complete machine; Fig. 2 represents a side elevation thereof; Fig. 3 represents a central vertical longitudinal section of a soap stone device forming a part of my improved apparatus; Fig. 4 represents a plan view of said device; Fig. 5 represents a front elevation of said device taken in the plane indicated by the line V—V, Fig. 3; Fig. 6 represents a central vertical transverse section, taken in the plane indicated by the line VI—VI, Fig. 3; Fig. 7 represents a detail view of a brush utilized in said soap stone device; Fig. 8 represents a plan view of a screw feeding device; Fig. 9 represents a vertical longitudinal section of said device; Fig. 10 represents a vertical transverse section taken in the plane indicated by the line X—X, Fig. 9; Fig. 11 represents a transverse vertical section, taken in the plane indicated by the line XI—XI, Fig. 9, showing in section and elevation the feed nozzle and rollers for molding the rubber upon the forming pole; Fig. 12 represents a fragmentary portion of the parts shown in Fig. 11, upon an enlarged scale; Fig. 13 represents a horizontal section of fragmentary parts, taken in the plane indicated by the lines XIII—XIII, Figs. 9 and 15; Fig. 14 represents, upon an enlarged scale, a plan view of said feed nozzle and one set of said rollers; Fig. 15 represents a side elevation of the parts shown in Fig. 14; Fig. 16 represents a central vertical longitudinal section, upon an enlarged scale, of the parts shown at the right in Fig. 9; Fig. 17 represents an elevation of a cutting-off device, taken in the plane indicated by the line XVII—XVII, Fig. 1, and showing the knife or cutting wheel at rest; Fig. 18 represents the same parts shown in Fig. 17 when the cutting wheel is brought down into contact with the rubber tube; Fig. 19 represents the same parts after the cutting wheel has completed about one-half a revolution; Fig. 20 is a horizontal section, upon an enlarged scale, of fragmentary parts, taken in the planes indicated by the line XX—XX, Fig. 18; Fig. 21 is a horizontal section taken in the plane represented by the line XXI—XXI, Fig. 18; Fig. 22 is a vertical longitudinal section, upon an enlarged scale, of fragmentary parts, taken in the plane represented by the line XXII—XXII, Fig. 19; Fig. 23 represents an elevation, upon an enlarged scale, of certain parts related to the cutting device and particularly showing a cam which throws in a clutch to effect the rotation of a gear which causes the revolving of the cutting wheels; Fig. 24 represents a vertical longitudinal section of certain parts related to the cutting device and particularly showing a cam which pulls the cutting wheels into contact with the rubber tube; Figs. 25 and 26 represent details, upon an enlarged scale, showing the connection at the ends of adjoining forming poles in closed and open relation, respectively; Figs. 27 and 28 represent, respectively, upon an enlarged scale, plan and side views of mechanism for moving a cutting off table; Fig. 29 represents a transverse vertical section of fragmentary parts taken in the plane indicated by the line XXIX—XXIX, Fig. 28; Figs. 30 and 31 represent transverse vertical sections, taken in the planes indicated by the lines XXX—XXX and XXXI—XXXI, respectively, Fig. 28; Figs. 32 and 33 represent, upon an enlarged scale, details of a yielding link, hereinafter more fully described; Figs. 34, 35 and 36 represent, respectively, assemblies of the cutting off device, the moving table, and the mechanism for moving the latter, showing (Fig. 34), the position of the parts at rest before the right hand end of the forming pole strikes an obstruction to trip a lever, resulting in the commencement of movement of the table; (Fig. 35), after said table has moved approximately one-third of its distance and the cutting wheel has been brought down into contact with the rubber tube; and (Fig. 36), after the table has moved about two-thirds of its distance and the cutting wheel has just started to rotate; Fig. 37 represents, upon an enlarged scale, a broken plan view of the forming rolls and some related elements; Fig. 38 represents a side elevation of the parts shown in Fig. 37, and Fig. 39 represents an end elevation of the parts shown in Fig. 38. The above figures disclose apparatus utilized for the production of inner tubes and in so far as noted in detail hereinafter, for the production of solid tires. Fig. 40 represents a transverse central vertical section of a pair of rolls utilized in connection with the molding of solid tires. Fig. 41 represents, upon an enlarged scale, a detail view illustrating heating of the forming rolls.

Referring to the annexed drawings, and as particularly bearing upon the production of inner tubes, a driving shaft 1 is indicated driven by any suitable source of power (not shown); three pairs of feeding rolls 2, 3 and 3', respectively, by which a hollow forming pole 4 is adapted to be progressively fed forward in the manner and for the purposes hereinafter fully explained, said sets of rolls 3 and 3' being also forming rolls for molding rubber 5 upon said forming pole 4 to make the inner tubes. Certain steps of the manufacture are indicated briefly, Figs. 1 and 2, by 6, a device for applying soap stone to the forming pole 4; by 7, a screw device for feeding and compressing the pieces of rubber to be molded into the tube; by 8, a cutting off device for separating such length of tube as is desired from that part of the molded rubber which is to the rear of such tube length; and by 9, a movable frame or table for keeping the cutting device 8 and connected parts in the same relative vertical planes as the plane of the rear end of the tube which is being severed in order to procure a straight cut, the rubber, of course, being carried forwardly upon the progressively fed pole. A suitable stationary frame 10 is provided for the cutting device 8 and the movable table 9, and various bearings, brackets, and other necessary fixed members are provided, all as will hereinafter fully appear, the whole being supported upon a main frame or support 10'.

Referring to the feeding and forming rolls 2, 3 and 3', there are provided suitable supporting brackets 11 and housings 12 for said sets of rolls and connected parts, the driving shaft 1 being formed with the worms 47, Figs. 1, 8 and 37, meshing with worm gears 48, Figs. 11 and 37, carried upon shafts 13 upon which one of each set of rolls 2, 3 and 3' are fixed so as to rotate therewith, suitable bearings for said shafts 13 being provided in said supports 11, there being provided upon the other end of the shaft 13 a gear 50 adapted to mesh with another gear 49 carried upon a shaft 51 for which suitable bearings in the support 11 are provided, and upon which last-named shaft the other of each set of rolls 2, 3 and 3' are fixed. It will be noted in the accompanying drawings that the respective rolls of the sets 3 and 3', respectively, are disposed at right angles one to the other. The purpose of such relative disposition will be fully explained hereinafter. The pair of rolls 2 are so spaced apart as to accommodate a pole 4 of the same exterior diameter as the inside diameter of the desired tube; and the rolls 3 and 3' are so spaced apart as to accommodate the forming pole 4 and the rubber 5 molded thereon, as hereinafter fully explained, equal to the exterior diameter of the desired inner tube. In order that inner tubes of varying inner diameters may be formed, it will be noted that the rolls 2 may be spaced varying distances apart by means of the adjusting screws 14 to accommodate poles 4 of varying diameters, and in order that these varying inner diameters of the inner tubes may be procured and also in order that tubes the thicknesses of whose walls vary may also be procured, accommodation is secured as regards the sets of rolls 3 and 3' by replacing these rolls with pairs of the requisite size, adjusting screws 52 being provided to secure the proper relative disposition of said rolls, the nozzle 46 and bushing 35 and screw end 44 also being replaced by elements of the proper sizes.

Carried upon the driving shaft 1 is a sprocket 15 connected to a second sprocket 16 by a chain 15', said sprocket 16 being provided with a hub member 17 secured to a shaft 18 for which suitable bearings are provided in the supporting standard 19. Said shaft 18 intersects a hopper 20 suitably supported by said supporting member 19 and formed with a mouth 21. A pair of gears 22 are fixed to the shaft 18 and are adapted to mesh with a pair of gears 23 provided with integral hubs 24. Secured by pins 26 to the inner lateral surfaces of the supporting frame members 19 are two series of rollers 25 rotatably mounted upon said pins 26 and disposed, as plainly shown in Fig. 3, adjacent to the outer surfaces of the hubs 24. The forming pole 4 intersects the gears 23 and hubs 24 and is centrally disposed relatively thereto, as plainly shown in Figs. 5 and 6. The body members of the gears 23 are provided with a series of spaced openings 27, Fig. 6, within which are adapted to be contained locking members 28 secured to the backs 29 of brushes 30. The bristles of the brushes 30 are confined between the two back members 29 of the brush by suitable retaining pins 31. The outer ends of the bristles are so disposed as to bear against the outer surface of the forming pole 4. There are provided hub members 32 fixed to the shaft 18 and formed with a series of spaced longitudinally disposed flanges 33, as plainly shown in Figs. 3, 4 and 6. Finely powdered soap stone is introduced into the hopper 20, distributed by the flanges 33, and applied to the outer surface of forming pole 4 by the brushes 30, as will be readily understood.

A sleeve 34 mounted in suitable brackets of the main support 10' is rotatably mounted upon forming pole 4 by means of a bushing 35, as plainly shown in Fig. 9. Said bushing 35 is readily replaced by bushing of varying sizes in order that poles of different diameters may be accommodated. A gear 36 secured to the driving shaft 1 is adapted to mesh with a gear 37 fixed to the sleeve 34 and the inner end of the latter is rotatably secured to an annular member 38 formed upon its outer surface with a screw feeding device 39, as plainly shown in Fig. 9, a thrust collar 40 being provided between the outer end of said annular member 38 and the inner end of one of the supporting bearings for the sleeve 34, as plainly seen in said Fig. 9. This screw feeding device which has hereinbefore been generally indicated in Figs. 1 and 2 by the numeral 7, is provided with a mouth into which pieces of rubber 41 are adapted to be fed. This screw feeding device is also provided with a water jacket 42. Disposed exteriorly of the screw feeding device are a series of flutes 43, shown in Figs. 9 and 10, to obviate the rotating of the rubber by said device. The front end 44 of the screw feeding device 38 is removable and may be replaced with varying sized ends in order to accommodate forming poles of different diameters. Said removability is indicated in Fig. 9 and the securing means are indicated by the ordinal 45. Removably secured to the front end of the water jacket 42 is a nozzle 46 adapted to feed the rubber particles conveyed and pressed within the screw 39 against the rotating surfaces of the forming rolls 3 in order to mold the inner tube 5. The action of the screw feeding device and the forming rolls is plainly indicated in Figs. 9 and 16.

Means will now be disclosed for cutting off in the plane perpendicular to the axis of the forming pole 4, the tube 5 which has been formed upon said pole. The cutting off device has hereinbefore been generally designated by the numeral 8 and this device will be called into action, after the tube 5 has attained the proper length, in the following manner: It will be noted in Fig. 34 that there is a roller 55 supported upon one end of an arm 56 at the right hand end of the machine, which arm is mounted upon a shaft 56' intermediately its ends and at its other end is secured to a short arm 57' intersected by a pin $57^2$ to which it is rigidly secured, said pin also intersecting the two arms of a yoke forming the end of a bar 57 which is connected by pins 58' to a second bar 58. This latter bar is connected to a rocker arm 59 pivotally mounted upon the fixed table 10, which rocker arm is pivotally connected to a link 60, carrying at its upper end the pin $61^4$ adapted to be reciprocated vertically in a slot $61^3$ contained in the frame member 61'. Also secured to said pin $61^4$ is a sliding block $61^5$, a recess for the vertical reciprocation of which is designated by $61^2$. A bar 62 is plainly shown in Figs. 27, 34, 35 and 36 pivoted to the movable table 9, said bar carrying a roller 61 at its outer end. When the parts of the apparatus are disposed as shown in Fig. 34, said roller 61 is disposed immediately above the sliding block $61^5$ and is supported thereon in the position plainly shown in said Fig. 34. A stationary cam $61^6$ is formed in the frame 10 within which the roller 61 travels in the manner hereinafter fully described. Referring again to Fig. 34, we will assume that the forming pole 4 and the tube 5 thereon have traveled so far to the right as to ride upon roller 55, said roller being so disposed as to provide for such action. The weight of the pole and the tube will tend to depress the roller and tilt the arm 56, as shown in Fig. 35. It is evident that this will effect the upward movement of the link 60 which will carry the roller 61 to the top of the recess $61^2$ moving the link 62 upwardly. Connected to said link 62 is a bar 62'. Figs. 32 and 33, formed with a reduced end portion $62^2$ intersected at its end by a pin $62^3$. A second member 63 is provided with a recess adapted to receive the reduced end portion $62^2$ of the member 62' and is also provided with a lateral slot 63' to provide for the vertical reciprocation of the pin $62^3$. Said members 62 and 63 are surrounded by spring 112 the normal tension of which is such as to tend to separate the members 62' and 63. The upper movement of the bar 62 will then compress the spring 112 and effect the pivotal movement of a bell-crank 64 pivoted to the moving table 9, one end of said angle bar being of yoke formation to surround a hub member of a clutch part 65 secured to the driving shaft 1. The rocking of the bell crank lever 64 will effect the frictional engagement of the clutch part 65 with a second clutch member 66 loosely mounted upon the driving shaft 1. Secured to a sleeve member of said clutch part 66 is a bevel gear 68 meshing with a gear 69 carried upon a vertical shaft 70, to the lower end of which shaft is secured a bevel gear 71 meshing with a bevel gear 72 secured to a shaft 74. Said shaft 74 runs transversely across the apparatus, as plainly shown in Fig. 27. Carried upon said shaft 74 are two gears 73 adapted to mesh with two racks 75 fixed to the stationary frame 10. Inasmuch as the cutting device is mounted upon the movable table 9, and inasmuch as a keyway 65' disposed longitudinally of the shaft 1 is provided for the clutch parts 65, 66, and other clutch parts 53 and 54, connected to the cutting device, it is evident that the proper tilting of the bar 56 will effect the commencement of the forward movement of the movable table 9 carrying with it the cutting device and said clutches.

Pivotally secured to two depending ears 76 and 92 connected, respectively, to the far and near sides of the movable table 9, as seen in Fig. 2, are two bars 77 and 93, to the free ends of which are secured rollers 78 and 94, respectively. It is evident that the forward movement of the movable table 9 will effect corresponding movements of said bars 77 and 93 and it is designed that said movements, through the medium of the rollers 78 and 94 and two cam surfaces 79 and 95 within which said rollers travel, said cam surfaces being formed in the stationary frame 10, will effect, respectively, the contact of the knives or cutting rollers 91, hereinafter more fully described, with the tube 5, and the commencement of the cutting action. A pivoted pawl 78' held in the position shown in Fig. 34 by a spring 78² and a pivoted pawl 94' free under the action of gravity to assume the position shown in said figure determine the paths of travel of the rollers 78 and 94 in the cams 79 and 95, respectively. This first effect, viz., the bringing of the cutting wheels 91 into contact with the tube 5 takes place when the movable table 9 has moved about one-third of its distance forwardly and is in the position shown in Fig. 35. The details by which this effect is secured are as follows: It will be noted that secured to the arm 77 intermediately of its ends is a vertically disposed bar 80, Figs. 17 and 35, to which is rigidly secured at its upper end a bar 81, the other end of the latter being pivoted to an ear 81' secured to casing members 8' of the cutting device, as plainly shown in Figs. 17, 18 and 19. Depending from the arm 81 is a sliding block 82 adapted to be vertically reciprocated in a slideway 82'. The casing members 8' of the cutting device which are secured together by the bolts 8², as plainly seen in Figs. 17, 18 and 19, are formed to contain between them a member formed with a peripheral gear 100 and upon an inwardly extending ear 88 connected to said gear part 100 is pivotally secured a rocker arm 87 to one end of which is slidably secured in a slot 86 a pin 85 intersecting the lower end of an arm 84 which carries upon its upper end a roller 83 also contained within the slot 82'. Said rocker arm 87 is provided with integral depending ears 89 within which is pivotally mounted an arm 90 carrying within a yoke formation at its end and pivotally mounted upon a pin 90' the two knives or cutting wheels 91 hereinbefore described. Secured to the other end of the rocker arm 87 is a spring 101 also secured to a bracket 103 which in turn is secured to the inner surface of the gear member 100, the tension of said spring 101 tending to hold the rocker arm 87 normally in the position shown in Fig. 17, i. e., with the knives 91 out of contact with the rubber tube 5. It is evident that the movement of the roller 78 downwardly in the runway or cam 79 to the position shown in Fig. 35 will effect the downward movement of the bar 80 and the resulting downward movement of the arm 82 which arm will depress the roller 83 and, consequently, the arm 87, so that the knives 91 will be carried thereby into the position shown in Fig. 18. The roller 83 is now positioned so that it intersects an inner annular recess 8³ formed in the casing 8' and within which recess it travels during the revolution of the cutting knives 91. The tension of the knives 91 upon the rubber 5, for the purposes of varying sized inner tubes, irregularities in the forming pole 4, etc., can be regulated by the adjusting pin 104 and the spring 104', plainly shown in Figs. 17, 18 and 19.

When the moving table 9 has covered about two-thirds of its forward movement and the parts are disposed as shown in Fig. 36, the rotation of the gear 100 commences in order to effect the cutting action of the knives 91. This action is effected as follows: The bar 93 has pushed the roller 94 riding in the cam 95 to the position where said roller is riding in the upper guideway forming a part of said cam 95 so that said arm 93 has raised an arm 96 connected thereto and secured at its upper end to a rocker arm 97 pivotally mounted on ear 97' secured to the casing 8' of the cutting device. The rocker arm 97 will be rocked to throw into frictional engagement a clutch part 54 fixed to the shaft 1 with a clutch part 53 loosely mounted upon said shaft and provided with a sleeve member to which is secured a pinion 99 meshing with the aforementioned gear 100. It is evident that this action will effect the commencement of the rotation of the knives 91. The different relative positions of said knives and their connecting parts during such rotation is plainly shown in Figs. 17 to 21, inclusive.

As soon as the cutting action has commenced and roller 83 has cleared the opening 82' so that the bar 82 may be raised without allowing the roller 83 to rise, this action is effected by reason of the fact that the roller 78 riding in the cam guideway 79 has reached a position just beyond that shown in Fig. 36 when, under the action of spring 109 secured to an ear 110 formed upon the moving table 9, the bar 77 is pulled upwardly so that the roller 78 is carried into an upper guideway of the cam 79 and the consequent raising of the bar 80 effects the upper movement of the arm 82 to the position shown in Fig. 17.

When the roller 83 has completed an entire revolution so as to have effected the cutting of the rubber entirely around the tube 5, it will encounter the recess 82' and under the action of the spring 101 will be raised with the block 84 to the position shown in Fig. 17. This will effect the positive discontinuance of the action of the cutting wheels, even if the clutches 53 and 54 stick and are not released immediately by the means now to be described.

The clutch parts 53 and 54 will tend to be disengaged by reason of the fact that the roller 94 will have reached the extreme right hand of the upper guideway of the cam 95, and, under the action of the spring 111, the arm 96 will be pulled downwardly so as to rock the arm 97 and disengage the clutch members, the roller 94 being depressed to the lower guideway of the cam 95.

Meanwhile the roller 61 in the cam $61^6$ will have been forced to the extreme right hand end of the upper guideway of said cam and under the action of the spring 112 the bar 62 will have been depressed forcing the roller 61, against the action of the spring 118 supporting the pivoted dog 117, down into the lower guideway of the cam $61^6$, thus effecting the discontinuance of the forward movement of the moving table 9. The spring 118 will retard the release of the clutch member 66 until the roller 61 has been forced far enough to the right (Fig. 36) so as certainly to be pulled rearwardly in the lower guideway of the cam $61^6$ by the moving table retracting weights now to be described. Connected to ears 116 upon the moving table 9 are cables 114 adapted to travel over rollers 115 secured to ears 115' formed upon the stationary frame 10, said cables carrying weights 113 which, upon the release of the clutch parts 65 and 66 pull the moving table 9 back to its rearward position. This will pull the roller 61 into the position shown in dotted lines in Fig. 36. However, such roller will not be pulled into the position shown in Fig. 34 until the sliding block $61^5$ has been pulled into its lowermost position, Fig. 34, which will not be effected until the pole 4 and tube 5 have been removed and the roller 55 released and allowed to assume the position shown in Fig. 34.

The accommodation necessary for making tubes of varying inner diameters and varying thicknesses of wall has been hereinbefore described and now the accommodation provided for varying the length of the tubes will be disclosed. It will be noted that the bars 57 and 58, plainly shown in Figs. 34, 35 and 36, are relatively movable, which relation can be plainly seen in Fig. 27. It will also be noted that the bracket 108 can be secured to the stationary frame 10 in various positions by means of the plurality of holes 108'. It will be evident, therefore, that the relative shifting of the bars 57 and 58 and the necessary connection of the bracket 108 to the frame 10 may be effected for the desired length of tube.

Inasmuch as it may be impossible or impracticable to cut a complete inner tube at exactly the junction point of two contiguous forming poles 4, the said poles are made somewhat longer than the desired tube and the contiguous ends are joined together by the means now to be described and the molded rubber 5 is cut by the pair of knives, as hereinbefore fully described, upon both sides of the contacting ends of the contiguous poles 4. The tube is then trimmed to the desired length. The means of connecting the contiguous ends of adjacent poles is plainly shown in Figs. 25 and 26 and comprises an annular member 119 secured to the inner wall of the end of one pole, said member being formed with shoulders 119' forming locks for a pair of latches 121 pivoted to ears 120 secured to the inner wall of the adjacent end of the other pole. Said latches 121 are normally held in the position locking the same by means of a spring 122 disposed as plainly shown in said Figs. 25 and 26, said latches being depressed to disconnect the poles, after a tube has been severed from the molded rubber upon the following pole, by means of finger pieces 123, as plainly shown in Fig. 25, recesses 124 being provided in the pole 4, so that raised areas 126 of the rubber will be formed to indicate the approximate junction point of the two adjacent poles and to allow for the depression of the latches 121 into the position shown in Fig. 25 for the separation of the poles 4.

The pair of rolls 3' disposed transversely to the pair of rolls 3 will effect the trimming off from the tube 5 of any fins formed upon said tube as it emerges from the rolls 3 and will also serve to work the rubber into a more homogeneous state than would be possible with one set of rolls.

Referring particularly to Fig. 40, a set of rolls 3² are therein indicated between which a solid tire 5' is being molded by the use of so much of the apparatus hereinbefore described as is applicable to such manufacture, a suitable nozzle 46 also being provided in addition to the suitable rolls 3², the opening in the screw feeding device 7 through which the pole 4 travels when making inner tubes being closed when molding solid tires by means of placing a cap on the screw end 44. The molded tires are forced out upon a suitable table or other support and measured and cut off manually. The fins formed upon solid tires can easily be trimmed so that it is not necessary to provide a set of rolls transverse to the rolls 3². This method of solid tire manufacture is much more rapid than the usual one of forcing the rubber through dies; will handle all kinds of stock; and, of course, by the simple replacement of the nozzle 46 and the rolls 3² allow for the formation of various shapes of tires. The upper roll 3² can be provided with cuts 3³ to provide suitable non-skid tread portions upon the tires and ribbons of suitable fabric 3⁴ might be fed into the lower roll 3² so as to furnish the bottom of the tire with said fabric.

Referring to the detail shown in Fig. 41, heating of the rolls is therein best seen. A steam pipe 13' enters the hollow spindle 13 through a suitable stuffing box and thence the steam passes into the hollow roll and out through another hollow portion of the spindle.

What I claim is:

1. In apparatus for making inner tubes, the combination of a suitable frame; driving means; a forming pole; means for conveying the latter along said frame; means for receiving pieces of rubber from the mills or mixers and progressively feeding and compressing the same longitudinally of said pole; and means providing moving surfaces between which said pole is conveyed, a space being provided intermediately said pole and said moving surfaces, said rubber being compressed into said space and molded upon said pole.

2. In apparatus for making inner tubes, the combination of a suitable frame; driving means; a forming pole; means for receiving and progressively feeding and compressing rubber; means provided with forming surfaces disposed about said pole, said means being adapted to receive the rubber from said feeding means, a space being provided intermediately said pole and said surfaces; and means for relatively moving said pole and said forming means, whereby the rubber is molded upon said pole.

3. In apparatus for making inner tubes, the combination of a suitable frame; driving means; a forming pole; means for conveying the latter along said frame; means for receiving and progressively feeding and compressing rubber longitudinally of said pole; and forming means provided with moving surfaces between which said pole is conveyed and adapted to mold the rubber upon said pole.

4. In apparatus for making inner tubes, the combination of a suitable frame; driving means; a forming pole; means for conveying the latter along said frame; means for receiving pieces of rubber from the mills or mixers and progressively feeding and compressing the same longitudinally of said pole; a pair of rolls through which said pole is conveyed, an annular space being provided intermediately said pole and said rolls, said rubber being compressed into said space and molded therein upon said pole; and means for cutting the molded rubber into tubes of desired lengths.

5. In apparatus for making inner tubes, the combination of a suitable frame; driving means; a forming pole; means for conveying the latter along said frame; a screw device for receiving pieces of rubber from the mills or mixers and conveying the same longitudinally of said pole; and means provided with rotating surfaces between which said pole is conveyed, a space being provided intermediately said pole and said surfaces, said rubber being compressed into said space and molded upon said pole.

6. In apparatus for making inner tubes, the combination of a suitable frame; driving means; a forming pole; means for conveying the latter along said frame; a screw device for receiving pieces of rubber from the mills or mixers and feeding the same longitudinally of said pole; a pair of rolls through which said pole is conveyed, an annular space being provided intermediately said pole and said rolls, said rubber being compressed into said space and molded therein upon said pole; and means for cutting the molded rubber into tubes of desired lengths.

7. In apparatus for making inner tubes, the combination of a suitable frame; driving means; a forming pole; means for conveying the latter along said frame; means for applying soap stone to said pole; a receiving hopper for rubber from the mills or mixers; a screw device into which said hopper feeds; and a pair of rolls through which said pole is conveyed, an annular space being provided intermediately said pole and said rolls, said rubber being compressed into said space and molded therein upon said pole.

8. In apparatus for making inner tubes, the combination of a suitable frame; driving means; a forming pole made in sections; means for supporting the latter and conveying the same along said frame; means for applying soapstone to said pole; means for molding rubber to said pole; means for cutting the molded rubber into tubes of the desired lengths; a movable table upon which said cutting means are supported; means connected with said driving means for moving said table in one direction at a speed equal to the speed at which said pole is conveyed; means for retracting said table; and means for preventing the effective action of said retracting means until a section of pole and the severed tube contained thereon have been removed from the apparatus.

9. In apparatus for making inner tubes, the combination of a suitable frame; driving means; a forming pole made in sections; means for supporting the latter and conveying the same along said frame, said means being adjustable to accommodate poles of varying diameters; means for applying soap stone to said pole; means for molding rubber to said pole, said means being removable and replaceable; means for cutting the molded rubber into tubes of desired lengths; a movable table upon which said cutting means are supported; means connected with said driving means for moving said table in one direction at a speed equal to the speed at which said pole is conveyed; means for retracting said table; and means for preventing the effective action of said retracting means until a section of pole and the severed tube contained thereon have been removed from the apparatus.

10. In apparatus for making inner tubes, the combination with a suitable frame, driving means, a forming pole made in sections, means for conveying the latter along said frame, means for applying soapstone to said pole, and means for molding rubber thereon; of a movable table, means connected with said driving means for moving said table in one direction at a speed equal to the speed at which said pole is conveyed, cutting means mounted upon said table, means for periodically moving the same into contact with the molded rubber, a clutch part secured to said driving means, a clutch part and a connected sleeve loosely mounted upon said driving means, means actuated by a table movement for actuating the means moving said cutting means, means actuated by the further table movement to cause said clutch parts frictionally to engage, said sleeve being connected to said cutting means to cause the latter to operate, means for retracting said table, and means for preventing the effective action of said retracting means until a section of pole and the severed tube contained thereon have been removed from the apparatus.

11. In apparatus for making inner tubes, the combination of a suitable frame; driving means; a forming pole; two pairs of rolls for supporting the latter and conveying the same along said frame; and means for receiving and progressively feeding and compressing pieces of rubber longitudinally of said pole, a space being provided intermediately said pole and the rolls of one pair, said rubber being compressed into said space and molded upon said pole.

12. In apparatus for making inner tubes, the combination of a suitable frame; driving means; a forming pole; two pairs of rolls for supporting the latter and conveying the same along said frame, the rolls of each pair being adjustable toward and from each other; a screw device for receiving pieces of rubber from the mills or mixers and feeding the same longitudinally of said pole, an annular space being provided intermediately said pole and the rolls of one pair, said rubber being compressed into said space and molded therein upon said pole; and means for cutting the molded rubber into tubes of desired lengths.

13. In apparatus for making inner tubes, the combination of a suitable frame; driving means; a forming pole; two pairs of rolls for supporting the latter and conveying the same along said frame, the rolls of each pair being adjustable toward and from each other; a screw device for receiving pieces of rubber from the mills or mixers and feeding the same longitudinally of said pole, an annular space being provided intermediately said pole and the rolls of one pair, said rubber being compressed into said space and molded therein upon said pole; means for cutting the molded rubber; a movable table upon which said cutting means are supported; means connected with said driving means for moving said table in one direction at a speed equal to the speed at which said pole is conveyed; adjustable means for predetermining when said table-moving means shall become operative, whereby tubes of varying lengths may be made, and means for retracting said table.

14. In apparatus for making inner tubes, the combination of a suitable frame; a driving shaft; a forming pole; means for conveying the latter along said frame; means for molding rubber upon said pole; a movable table; clutch parts respectively loosely mounted upon and secured to said driving shaft; a member mounted upon said table and intersecting the path of movement of said pole; means connecting said member and said clutch parts to cause the latter frictionally to engage when said pole contacts with said member; means connecting said clutch and said table to cause the latter to move in one direction at a speed equal to the speed at which said pole is conveyed; means mounted upon said table for cutting the molded rubber; other clutch parts connected with said driving shaft; means actuated by the table movement to cause said clutch parts frictionally to engage; means connecting said clutch and said cutting means; means for disengaging said clutches; and means for retracting said table.

15. In apparatus for making inner tubes, the combination of a suitable frame; a driving shaft; a forming pole; means for conveying the latter along said frame; means for molding rubber upon said pole; a movable table; means mounted upon said table for cutting the molded rubber; two clutches, each comprising a part loosely mounted upon said driving shaft and a part secured thereto; a pair of camways formed in said frame; a member mounted upon said table and intersecting the path of movement of said pole; means mounted upon said table and respectively connecting said member and one of said camways with said clutches to cause the latter frictionally to engage and including a roller adapted to travel in said camway; means connecting one of said clutches with said table, the construction being such that the contacting of said member by said pole causes said clutch to move said table through said connecting means; means for disengaging said last-named clutch; means connecting the other clutch with said cutting means to cause the latter to revolve; means for moving the cutting means into contact with the molded rubber and including a roller adapted to travel in said second camway, said last-named means and connections arranged to become effective before said cutting means are revolved; and means for retracting said table.

16. In apparatus for making inner tubes, the combination of a suitable frame; driving means; a forming pole; means for conveying the latter along said frame; and means for molding rubber to said pole including elements provided with two sets of moving surfaces between which said pole is conveyed, and means for progressively feeding and compressing pieces of rubber into the spaces between said pole and said sets of surfaces, respectively, said sets of surfaces being disposed transversely one of the other.

17. In apparatus for making inner tubes, the combination of a suitable frame; driving means; a forming pole; means for conveying the latter along said frame; means for receiving pieces of rubber from the mills or mixers and progressively feeding and compressing the same longitudinally of said pole; and two pairs of rolls through which said pole is conveyed, said pairs of rolls being disposed transversely one of the other, spaces being provided intermediately said pole and said sets of rolls, respectively, said rubber being fed into said spaces in succession and molded upon said pole.

18. In apparatus for making inner tubes, the combination of a suitable frame; driving means; a forming pole; means for conveying the latter along said frame; means for receiving pieces of rubber from the mills or mixers and progressively feeding and compressing the same longitudinally of said pole; two pairs of rolls through which said pole is conveyed, said pairs of rolls being disposed transversely one of the other, annular spaces being provided, respectively, intermediately said pole and said sets of rolls, said rubber being fed into said spaces in succession and molded upon said pole; and means for cutting the molded rubber into tubes of desired lengths.

19. In apparatus for making inner tubes, the combination of a suitable frame; driving means; a forming pole; means for conveying the latter along said frame; a screw device for receiving pieces of rubber from the mills or mixers and conveying the same longitudinally of said pole; two pairs of rolls through which said pole is conveyed, said pairs of rolls being arranged transversely one of the other, annular spaces being provided, respectively, intermediately said pole and said sets of rolls, said rubber being fed into said spaces in succession and molded upon said pole; and means for cutting the molded rubber into tubes of desired lengths.

20. In apparatus for making rubber products, the combination of a suitable frame; driving means; a pair of opposed rolls having end flanges and so related and disposed as to rotate upon their opposed flanges and to form between them a space corresponding to a cross-section of the desired product; and means for receiving pieces of rubber from the mills or mixers and progressively feeding and compressing the same into said space where it is molded into the desired product.

21. In apparatus for making rubber products, the combination of a suitable frame; driving means; a pair of opposed rolls having end flanges and so related and disposed as to rotate upon their opposed flanges and to form between them a space corresponding to a cross section of the desired product; and a screw device for receiving pieces of rubber from the mills or mixers and progressively feeding and compressing same into said space where it is molded into the desired product.

22. In apparatus for making inner tubes, the combination of a suitable frame; driving means; a forming pole; means for conveying the latter along said frame; means for receiving pieces of rubber from the mills or mixers and progressively conveying and compressing the same longitudinally of such pole, and means formed with moving surfaces between which said pole is conveyed, a space being provided intermediately said pole and said surfaces, said rubber being compressed into said space and molded upon said pole.

23. In apparatus for making inner tubes, the combination of a suitable frame; driving means; a forming pole; means for conveying the latter along said frame; means for receiving pieces of rubber from the mills or mixers and progressively conveying and compressing the same longitudinally of such pole; a pair of rolls through which said pole is conveyed, an annular space being provided intermediately said pole and said rolls, said rubber being compressed into said space and molded therein upon said pole; and means for heating said rolls.

24. In apparatus for making inner tubes, the combination of a suitable frame; driving means; a forming pole; means for conveying the latter along said frame; means for receiving pieces of rubber from the mills or mixers and progressively conveying and compressing the same longitudinally of such pole; a pair of hollow rolls through which said pole is conveyed, an annular space being provided intermediately said pole and said rolls, said rubber being compressed into said space and molded therein upon said pole; and means furnishing steam to said hollow rolls.

Signed by me this 13th day of April, 1917.

HARLEY C. KNECHT.